Figures 1, 2:
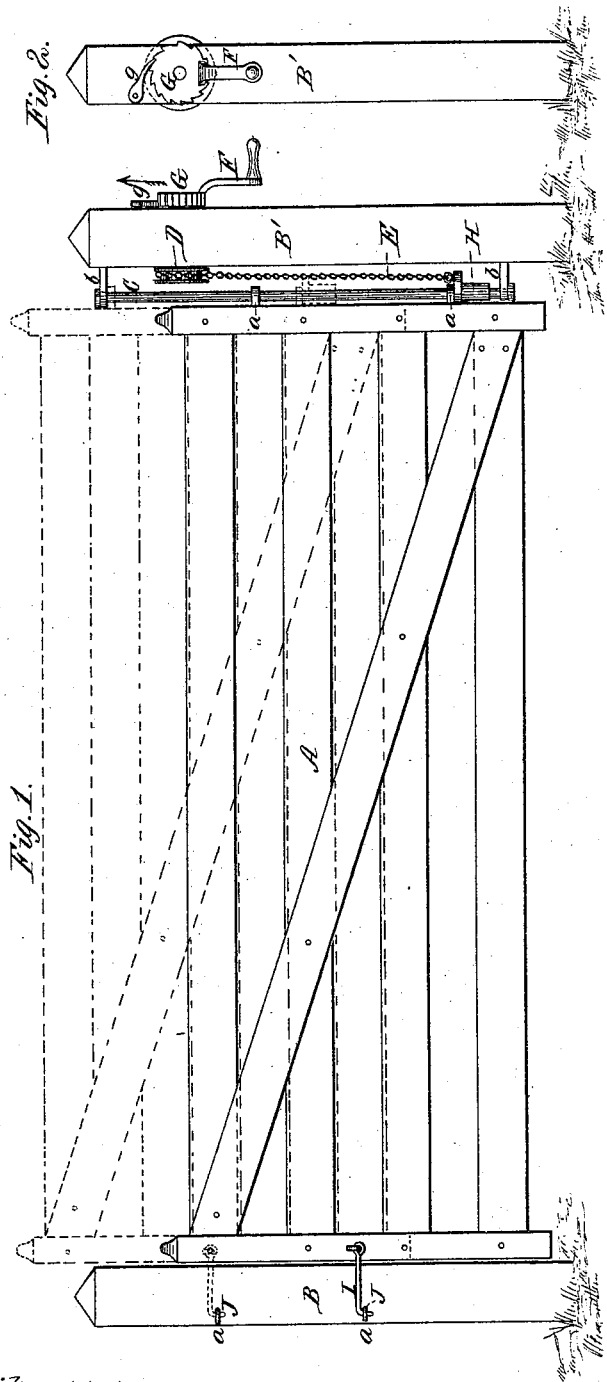

(No Model.)

I. E. SMITH.
GATE.

No. 287,184. Patented Oct. 23, 1883.

Witnesses:
W. C. Jordinston
Fred F. Church

Inventor:
Israel E. Smith
by
Melville Church
his Attorney.

UNITED STATES PATENT OFFICE.

ISRAEL E. SMITH, OF YORK, ASSIGNOR TO SAMUEL A. SHROFF, OF COLUMBIA, PENNSYLVANIA.

GATE.

SPECIFICATION forming part of Letters Patent No. 287,184, dated October 23, 1883.

Application filed July 25, 1883. (No model.)

*To all whom it may concern:*

Be it known that I, ISRAEL E. SMITH, of York, in the county of York and State of Pennsylvania, have invented a new and Improved Gate; and I do hereby declare the following to be a full, clear, and exact description of the same, reference being had to the accompanying drawings, forming a part of this specification, and to the figures and letters of reference marked thereon.

Figure 1 is a side elevation of my improved gate lowered to its lowest point, but shown raised by the dotted lines; Fig. 2, an end view showing the pawl and ratchet for holding the gate in raised position.

Similar letters of reference in the several figures denote the same parts.

My invention has for its object to provide an improved gate that can be readily adjusted at any desired height, and which, when in raised position, will prevent large animals—such as horses, cows, &c.—from passing through the gateway, but will permit of the passage of smaller animals—such as sheep, pigs, &c.—and which, if the supporting-post should sink into the ground, would allow the gate to be raised so as to keep it at the normal distance from the ground and permit it to swing freely upon its hinges; and it consists in certain novel details of construction, which I will first describe, and then point out particularly in the claim at the end of this specification.

In the accompanying drawings, A represents the gate swinging between the posts B B'. Upon one end of the gate are two staples or eyebolts, $a$ $a$, placed at a suitable distance apart, and adapted to encircle and slide upon a rod, C, which is supported near its ends in corresponding staples or eyebolts, $b$ $b$, inserted in the post B'. Said rod has upon its upper end a head, while at its lower end it is screw-threaded, and is provided with a nut, which will permit it to be removed to hang the gate. Near the top of the post B' is a short shaft, extending through the post, and having on its inner end a grooved wheel, D, to which is attached a chain, E, having on its outer end a crank, F, and ratchet-wheel G. A pawl, $g$, hung upon the post, engages with the teeth of the ratchet-wheel. Mounted upon the rod C is a sliding sleeve, H, to which the other end of the chain E is attached. This sleeve is underneath the lower one of the eyebolts $a$, and directly supports the whole gate. A hook, I, is provided on the gate, and is adapted to engage with one or the other of staples J on the post B, according to the position in which the gate is adjusted.

When it is desired to raise the gate for any purpose, the crank F is turned in the direction of the arrow in Fig. 1, thus winding the chain E upon the wheel D, and causing the sleeve H to lift upon the lower one of the eyebolts $a$ and raise the entire gate.

The gate may be constructed of bars of wood or metal, or of wire frame-work, and of any desired shape and configuration.

Having thus described my invention, I claim as new—

The combination, with the posts B B', of the gate hung between the said posts, and having the hinge staples or eyes $a$ $a$ at one end, the rod C, mounted on the post B', and passing through the hinge-staples $a$ $a$, the long sleeve H, encircling the rod C below the lower staple $a$, the chain E, connected at one end to the sleeve H and at the other to the grooved wheel D, the said grooved wheel mounted on a shaft passing through the post B', the ratchet-wheel G, crank F, and pawl $g$, the whole constructed and arranged so that an operator standing at the post can conveniently raise and lower the gate and lock it in adjusted position, substantially as described.

ISRAEL E. SMITH.

Witnesses:
 D. BEAVERSON,
 GEO. GRAYBILL, Jr.